(12) United States Patent
Kang et al.

(10) Patent No.: US 9,298,384 B2
(45) Date of Patent: Mar. 29, 2016

(54) METHOD AND DEVICE FOR STORING DATA IN A FLASH MEMORY USING ADDRESS MAPPING FOR SUPPORTING VARIOUS BLOCK SIZES

(75) Inventors: Soo Yong Kang, Gyeonggi-do (KR); You Jip Won, Gyeonggi-do (KR); Jae Hyuk Cha, Gyeonggi-do (KR); Sung Min Park, Seoul (KR); Sung Roh Yoon, Seoul (KR); Jong Moo Choi, Gyeonggi-do (KR)

(73) Assignee: Industry-University Cooperation Foundation Hanyang University, Seoul (KR)

( * ) Notice: Subject to any disclaimer, the term of this patent is extended or adjusted under 35 U.S.C. 154(b) by 230 days.

(21) Appl. No.: 14/346,448

(22) PCT Filed: Aug. 31, 2012

(86) PCT No.: PCT/KR2012/006958
§ 371 (c)(1),
(2), (4) Date: Mar. 21, 2014

(87) PCT Pub. No.: WO2013/042880
PCT Pub. Date: Mar. 28, 2013

(65) Prior Publication Data
US 2014/0223089 A1   Aug. 7, 2014

(30) Foreign Application Priority Data
Sep. 23, 2011   (KR) .................. 10-2011-0096302

(51) Int. Cl.
*G06F 12/10* (2006.01)
*G06F 3/06* (2006.01)
*G06F 12/02* (2006.01)

(52) U.S. Cl.
CPC .............. *G06F 3/064* (2013.01); *G06F 3/0611* (2013.01); *G06F 3/0679* (2013.01); *G06F 12/0246* (2013.01)

(58) Field of Classification Search
CPC ..... G06F 3/064; G06F 3/0611; G06F 3/0679; G06F 12/0246
See application file for complete search history.

(56) References Cited

U.S. PATENT DOCUMENTS 7,941,600 B2 * 5/2011 Yagisawa ................ G06F 3/061
                                                    711/112
8,738,851 B2 * 5/2014 Kunimatsu .......... G06F 12/0246
                                                    711/103

(Continued)

FOREIGN PATENT DOCUMENTS

JP    11-039210 A    2/1999
JP    11-250672 A    9/1999

(Continued)

OTHER PUBLICATIONS

International Search Report of PCT/KR2012/006958 mailed on Feb. 20, 2013.

*Primary Examiner* — John Lane
(74) *Attorney, Agent, or Firm* — Rabin & Berdo, P.C.

(57) ABSTRACT

The present invention relates to a method and device for storing data in a flash memory using address mapping for supporting various block sizes. A storage device determines the size of a block that a host system uses on the basis of the size of data that the host system requests and uses the determined block size as a mapping unit. Additionally, the storage device divides a logical address space into at least one area, and maps an address using the minimum units of different mappings in each divided area.

15 Claims, 10 Drawing Sheets

(56) References Cited

U.S. PATENT DOCUMENTS

| | | |
|---|---|---|
| 2010/0199024 A1 | 8/2010 | Jeong |
| 2012/0072680 A1* | 3/2012 | Kimura ............... G06F 11/108 711/154 |
| 2014/0074450 A1* | 3/2014 | Buswell ............. G06F 12/0246 703/21 |
| 2014/0075104 A1* | 3/2014 | Buswell ............. G06F 12/0246 711/103 |
| 2015/0363327 A1* | 12/2015 | Chaitanya ........... G06F 12/1009 711/103 |

FOREIGN PATENT DOCUMENTS

| | | |
|---|---|---|
| JP | 2002-163139 A | 6/2002 |
| KR | 10-2010-0089229 A | 8/2010 |
| KR | 10-2010-0117560 A | 11/2010 |

\* cited by examiner

100

| Index | Physical block address |
|---|---|
| 0 | 2 |
| 1 | 10 |
| 2 | 11 |
| 3 | 50 |
| 4 | 100 |

| Index | Physical page address |
|---|---|
| 0 | 10 |
| 1 | 30 |
| 2 | 2 |
| 3 | 5 |
| 4 | 70 |

| Starting address of logical page | Size | Starting address of physical page |
|---|---|---|
| 0 | 100 | 50 |
| 100 | 80 | 150 |
| 180 | 50 | 230 |
| 230 | 1 | 500 |
| 231 | 2 | 603 |

METHOD AND DEVICE FOR STORING DATA IN A FLASH MEMORY USING ADDRESS MAPPING FOR SUPPORTING VARIOUS BLOCK SIZES

TECHNICAL FIELD

The present invention relates to a method and device for storing data using a flash memory.

The present invention discloses a method and device for storing data in a flash memory using an address mapping supporting various sizes of blocks.

BACKGROUND ART

A storage may be connected to a host, and perform a data access operation in response to a request from the host. For example, the storage may read data stored in the storage in response to a data read request from the host, and provide the read data to the host. Also, the storage may store data provided by the host in the storage, in response to a data write request from the host. The storage may use various media to store the data based on a type of data to be stored. A flash memory storage device such as a solid state disk (SSD) is a device for storing data using a flash memory.

The flash memory may erase data based on a block corresponding to a relatively large unit, and read or write the data based on a page corresponding to a relatively small unit. Similar to a block in which a number of erasures is limited, the flash memory may have various restrictions.

A flash transition layer (FTL) included in the flash memory storage device may provide a function of mapping to convert a logical address of data into a physical address. The logical address of data may be used to determine data requested, by the host, to be read or written. The logical address of data may be a sector number. The physical address of data may be a location of data included in the storage. Similar to an existing storage device, the FTL may enable the flash memory storage device to read or write the data based on a sector unit.

The flash memory storage device may manage a data structure required to map a memory address. Also, the flash memory storage device may use a predetermined size as a unit of mapping. Korean Patent Publication No. 10-2010-0117560 published on Nov. 3, 2010 discloses a flash memory storage device for providing a set of pages, each having a different size.

DISCLOSURE OF INVENTION

Technical Goals

An aspect of the present invention provides a flash memory storage device using a size of a block used by a host system and a mapping method of the flash memory storage device.

Another aspect of the present invention also provides a flash memory storage device for providing a different minimum unit of mapping for each area, and a mapping method of the flash memory storage device.

Technical Solutions

According to an aspect of the present invention, there is provided a storage device including a flash memory to store data, a block size determining unit to determine a size of a block used by a host system connected to the storage device, and an address mapping management unit to map a logical address of the storage device to a physical address of the flash memory, using the determined size as a unit of mapping.

The block size determining unit may determine the size of the block used by the host system in response to a data access request of the host system.

The block size determining unit may determine the size of the block used by the host system based on a quantity of data requested by the data access request.

The block size determining unit may determine that the size of the block used by the host system corresponds to a minimum quantity of data, among quantities of data requested by at least one data access request.

The size of the block may be a size of a block used by a file system of the host system, or a database system of the host system.

A logical address space of the storage device may be divided into at least one area.

The block size determining unit may determine the size of the block used by the host system, for each of the at least one area in order to access each of the at least one area.

The address mapping management unit may map the logical address corresponding to a predetermined area among the at least one area, to a physical address of the flash memory using the determined size.

According to another aspect of the present invention, there is also provided a storage device including a flash memory to store data, a block size determining unit to divide a logical address space of the storage device into at least one area, and determine a minimum unit of mapping to be used for each of the at least one area, and an address mapping management unit to map a logical address corresponding to a predetermined area among the at least one area, on a physical address of the flash memory using the determined minimum unit of mapping.

The address mapping management unit may manage each of the at least one area using a range mapping having a different fixed size unit.

The fixed size unit may be the minimum unit of mapping to be used for each of the at least one area.

The block size determining unit may manage an area table storing a pointer indicating mapping information on each of the at least one area and the minimum unit of mapping to be used for each of the at least one area.

The address mapping management unit may manage a range mapping tree storing the mapping information on each of the at least one area.

The range mapping tree may be extended based on a pattern of a data write request requested from a host system for an area corresponding to the range mapping tree.

When a size of the range mapping tree is greater than or equal to a predetermined size, the address mapping management unit may convert a predetermined portion of the range mapping tree into a fixed size unit table indicating at least one fixed size unit.

The flash memory may store the area table, the range mapping tree, and the fixed size unit table.

The storage device may further include a random-access memory (RAM) to cache the area table, the range mapping tree, and the fixed size unit table.

The block size determining unit may determine the minimum unit of mapping to be used for each of the at least one area, based on a quantity of data used by the host system in order to access each of the at least one area.

The minimum unit of mapping may be a size of a block used by a file system of the host system, or a database system of the host system for each of the at least one area.

According to still another aspect of the present invention, there is also provided an address mapping method of a storage device using a flash memory, the method including determining a size of a block used by a host system connected to a storage device, and mapping a logical address of the storage device to a physical address of the flash memory, using the determined size.

The address mapping method may further include receiving a data access request from the host system.

The size of the block may be determined based on a quantity of data requested by the data access request.

A logical address space of the storage device may be divided into at least one area.

The determining may include determining the size of the block used by the host system for each of the at least one area in order to access each of the at least one area.

The mapping may include mapping the logical address corresponding to a predetermined area among the at least one area, to the physical address of the flash memory, using the determined size.

According to yet another aspect of the present invention, there is also provided an address mapping method of a storage device using a flash memory, the method including dividing a logical address space of the storage device into at least one area and determining a minimum unit of mapping to be used for each of the at least one area, and mapping a logical address corresponding to a predetermined area among the at least one area, to a physical address of the flash memory using the determined size.

The at least one area may be managed using a range mapping having a different fixed size unit, and the fixed size unit may be the minimum unit of mapping used for each of the at least one area.

The address mapping method may further include managing an area table storing a pointer indicating mapping information on each of the at least one area and the minimum unit of mapping to be used for each of the at least one area, and managing a range mapping tree storing the mapping information on each of the at least one area.

The minimum unit of mapping may be determined based on a quantity of data used by the host system in order to access each of the at least one area.

Advantageous Effects

According to an aspect of the present invention, it is possible to provide a flash memory storage device using a size of a block used by a host system and a mapping method of the flash memory storage device.

According to another aspect of the present invention, it is possible to provide a flash memory storage device for providing a minimum unit of mapping differing for each area, and a mapping method of the flash memory storage device.

According to still another aspect of the present invention, it is possible to provide a flash memory storage device for providing a performance enhanced by matching a unit managed for an address mapping in a flash transition layer (FTL) and a unit managed for managing an address mapping in the file system or a database system of a host system.

BRIEF DESCRIPTION OF DRAWINGS

FIG. 1 illustrates an example of a block mapping table for use in a block mapping scheme.

FIG. 2 illustrates an example of a page mapping table for use in a page mapping scheme.

BEST MODE FOR CARRYING OUT THE INVENTION

Figures 3, 4:
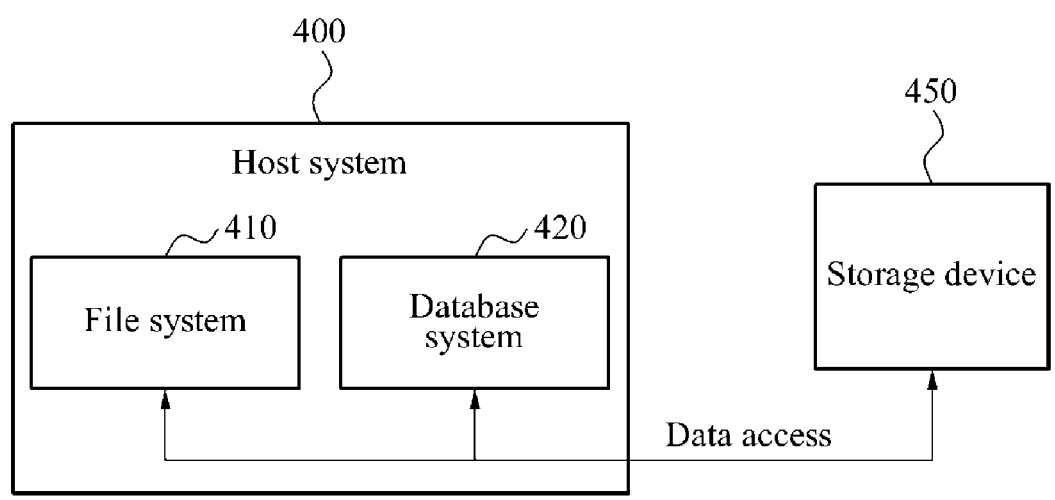
FIG. 3 illustrates an example of a range mapping table for use in a range mapping scheme.
FIG. 4 illustrates an example of operations of a host and a storage device according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

A flash transition layer (FTL) mapping scheme may include a block mapping scheme, a page mapping scheme, a range mapping scheme, and the like. Hereinafter, descriptions about the block mapping scheme, the page mapping scheme, and the range mapping scheme will be provided with reference to FIGS. 1 through 3.

FIG. 1 illustrates an example of a block mapping table for use in a block mapping scheme.

The block mapping scheme may refer to a scheme of using a block as a unit of mapping with respect to an entire flash memory area. Hereinafter, an FTL using the block mapping scheme may also be referred to as a block mapping FTL. The block mapping FTL may use a block, which is a unit of erasing a flash memory, as the unit of mapping.

In a block mapping table 100, each entry, for example, each line of a table may store an address of a physical block of the flash memory. As an example, in the block mapping table 100, data, for example, a logical block "0", on a logical address corresponding to an index "0" may be stored in a block, for example, a physical block "2", of which a physical block address is "2". Here, an index may indicate an address of a logical block.

The block mapping scheme may be appropriately used when data included in the flash memory is referred sequentially.

FIG. 2 illustrates an example of a page mapping table for use in a page mapping scheme.

The page mapping scheme may refer to a scheme of using a page as a unit of mapping with respect to an entire flash memory area. Hereinafter, an FTL using the page mapping scheme may also be referred to as a page mapping FTL. The page mapping FTL may use a page which is a unit of reading and writing a flash memory or a sector unit, as the unit of mapping.

In the page mapping scheme, the flash memory may be divided into a data area and an empty area. When a space occupied by an area reaches a predetermined threshold, for example, when a space occupied by the data area has a value greater than or equal to a predetermined threshold, or when a space occupied by the empty area has a value less than or equal to a predetermined threshold, a process of garbage collection may be executed to obtain the space occupied by the empty area. Here, the process of garbage collection may refer to a process of 1) selecting partial blocks from among blocks being used in the flash memory, 2) relocating valid pages included in the selected partial blocks to another empty block, and 3) erasing information included in the selected partial blocks, thereby emptying the selected partial blocks.

Each entry of a page mapping table 200 may store an address of a physical page of the flash memory. As an example, in the page mapping table 100, data, for example, a logical page "0", on a logical address corresponding to an index "0" may be stored in a page, for example, a physical page "10", of which a physical page address is "10". Here, an index may indicate an address of a logical page.

The page mapping scheme may be appropriately used when data included in the flash memory is referred to non-sequentially.

The aforementioned block mapping table 100 and page mapping table 200 may be fully maintained in a memory, for example, a dynamic random access memory (DRAM), a static random access memory (SRAM), and a volatile memory. In addition, the block mapping table 100 and the page mapping table 200 may be maintained in the flash memory, and a portion of each may be cached in a memory.

Preferably, the block mapping scheme may be not be used alone. In general, a mixed mapping scheme in which the page mapping scheme is used for a partial interval of the flash memory while basically using the block mapping scheme may be used.

The mixed mapping scheme may maintain a map, for example, a block mapping table based on a block unit with respect to a block mapping area, and maintain a map, for example, a page mapping table based on a page unit.

When a data write request is transferred from a host to a storage device using the mixed mapping scheme, the storage device may write data on a page mapping area. When a space of the page mapping area is full, the storage device may obtain a space of the page mapping area again using a merge operation. The merge operation may indicate a process of merging at least one page and writing data associated with the merged page on a block included in the block mapping area. When the data associated with the merged page is relocated to the block, the merged page may be in an empty state.

When the data writing request is transferred from the host to the storage device using the mixed mapping scheme, the storage device may explore the page mapping area and then, determine whether requested data is present in the page mapping area. When the requested data is present in the page mapping area, the storage device may read the requested data from the page mapping area and provide the read data to the host. When the requested data is absent in the page mapping area, the storage device may read the requested data from the block mapping area and provide the read data to the host.

FIG. 3 illustrates an example of a range mapping table for use in a range mapping scheme.

In contrast to a block mapping scheme and a page mapping scheme, a size of a unit of mapping may be determined based on a quantity of data requested by a data write request transmitted from a host in the range mapping scheme. In the block mapping scheme and the page mapping scheme, a unit of mapping may be configured to have a predetermined size. Thus, each entry of a range mapping table 300 may maintain 1) a starting address of a logical page, 2) a size or an ending address of the logical page, and 3) a starting address of a physical page of a flash memory, while each entry of the block mapping table 100 or the page mapping table 200 may maintain an address of a physical block or a page of the flash memory. For example, in the range mapping table 300, a logical page "100" to a logical page "179" may be mapped on a physical page "150" to a physical page "229". In this example, data on the logical page "100" may be stored in the physical page "150".

Similar to the page mapping scheme, the flash memory may be divided into a data area and an empty area in the mixed mapping scheme. When a space of the empty area reaches a predetermined value, for example, a space occupied by the empty area has a value less than or equal to a predetermined threshold, a process of garbage collection may be executed.

FIG. 4 illustrates an example of operations of a host and a storage device according to an embodiment of the present invention.

A host system 400 may use a file system 410 and/or a database system 420. The file system 410 and the database system 420 may manage a logical area, for example, a logical address space for utilization using blocks having a predetermined size. The file system 410 may format a predetermined partition area into a size, for example, a size between 128 kilobytes (KB) and 512 KB of a block based on a user requirement.

In general, when the file system requests a data access, to the storage device, the formatted block may be used to be a minimum unit of a request. For example, when the file system 410 reads data from a storage device 450, the file system 410 may request data of which a quantity corresponds to an n times size of the block. Also, when the file system 410 writes data on the storage device 450, the file system 410 may transmit, to the storage device 450, data of which a quantity corresponds to a multiple of the minimum unit of the request.

In addition, the database system 420 may use a predetermined block size as a minimum unit of data input and output, aside from the size of the block used by the file system 410. For example, when the database system 420 reads data from the storage device 450, the database system 420 may request, to the storage device 450, data of which a quantity corresponds to an n times size of the block used by the database system 420.

When a unit of mapping to be used by an FTL is unrelated to the block used by the file system 410 or the database system of the host system 400, an overhead may occur in the storage device 450. For example, when the unit of mapping to be used by the FTL is 1 KB while a minimum unit of data requested from the host is 2 KB, the storage device 450 may access internal data twice, through two mappings, in order to process a single request. Also, when the unit of mapping to be used by the FTL is 4 KB while the minimum unit of data requested from the host is 3 KB, the storage device 450 may access the internal data twice, through two mappings, in order to process a single request, depending on a case.

Accordingly, when the unit of mapping to be used by the FTL of the storage device 450 is equal to the size of the block used by the file system 410 or the database system 420 of the host system 400, the storage device 450 may efficiently process a data access request from the host system 400.

Figure 5:
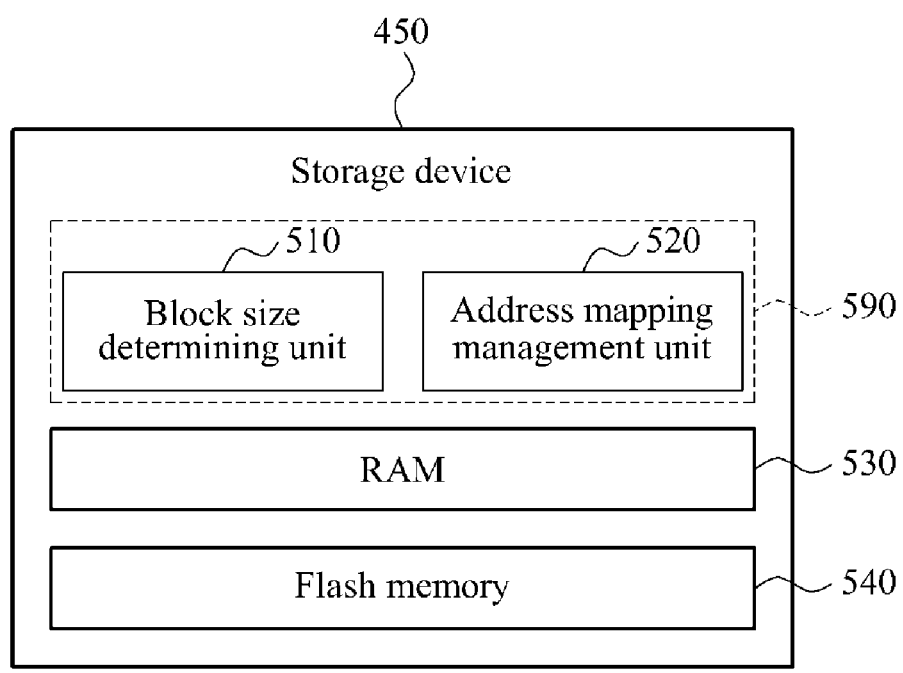
FIG. 5 illustrates an example of a configuration of a storage device according to an embodiment of the present invention.

FIG. 5 illustrates an example of a configuration of a storage device according to an embodiment of the present invention.

The storing unit 450 may include a block size determining unit 510, an address mapping management unit 520, a random-access memory (RAM) 530, and a flash memory 540. The block size determining unit 520 and the address mapping management unit 520 may be included in an FTL 590. Thus, the FTL 590 of the storage device 450 may include the block size determining unit 510 and the address mapping management unit 530.

The RAM 530 and the flash memory 540 may store data.

The block size determining unit 510 may determine a size of a block used by a host system connected to the storage device 450.

The address mapping management unit 520 may map a logical address of the storage device 450 on a physical address of the flash memory 540, using the determined size as a unit of mapping.

In this instance, the block size determining unit 510 may determine the size of the block used by a host system 400 in response to a data access request of the host system 400. The block size determining unit 510 may determine the size of the block used by the host system 400 based on a quantity of data requested by the data access request. The block size determining unit 510 may determine that the size of the block used by the host system 400 corresponds to the quantity of data requested by the data access request.

The host system 400 may request, to the storage device 450, data of which a quantity corresponds to a multiple of the size of the block used by the host system 400. Thus, the block size determining unit 510 may determine the size of the block used by the host system 400 based on a minimum quantity of data among quantities of data requested by at least one data access request of the host system 400. The block size determining unit 510 may determine that the size of the block used by the host system 400 corresponds to the minimum quantity of data among the quantities of data requested by the at least one data access request.

As described above, the size of the block used by the host system 400 may be the size of the block used by the file system 410 of the host system 400 or the database system 420 of the host system 400.

Figure 6:
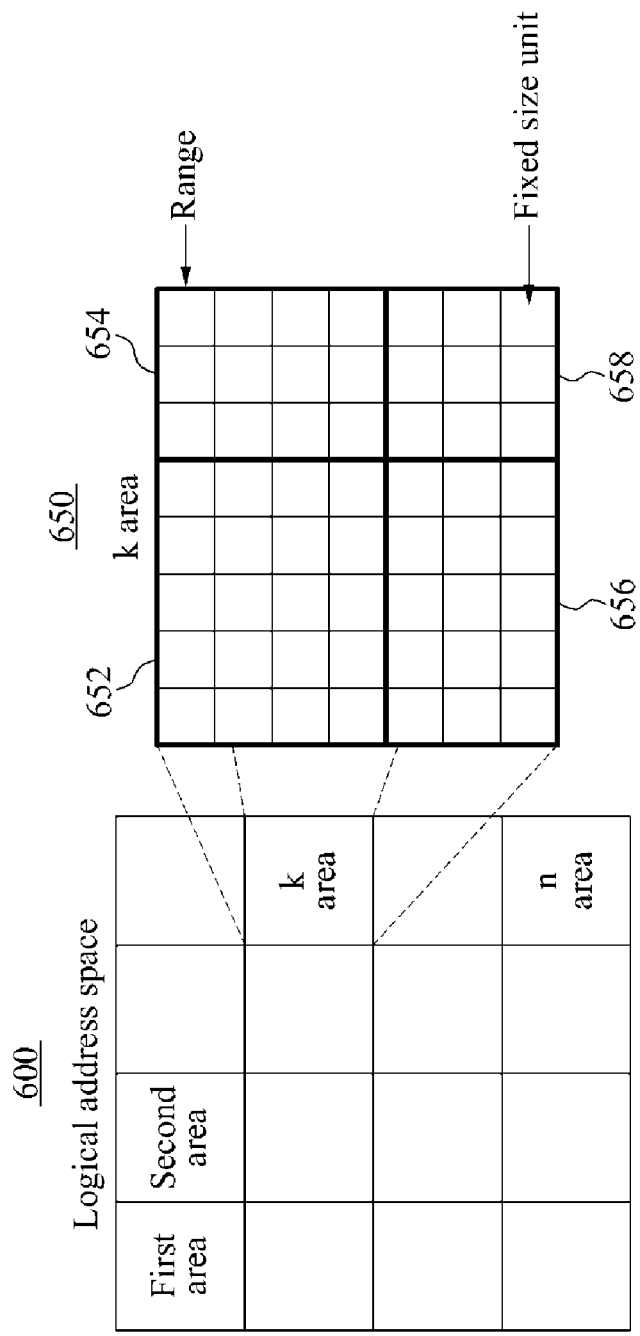
FIG. 6 illustrates an example of a logical address space of a storage device, divided into at least one area according to an embodiment of the present invention.

FIG. 6 illustrates an example of a logical address space of a storage device, divided into at least one area according to an embodiment of the present invention.

A logical address space 600 of the storage device 450 may be divided into at least one area. In FIG. 6, the logical address space 600 of the storage device 450 may be divided into n areas having a predetermined size.

Each area may be managed using a range mapping. The range mapping may be managed using a fixed size unit. In FIG. 6, a k area 650 may use four ranges including a first range 652, a second range 654, a third range 656, and a fourth range 658. The first range 652 may indicate a range corresponding to 15 fixed size units.

Figure 7:
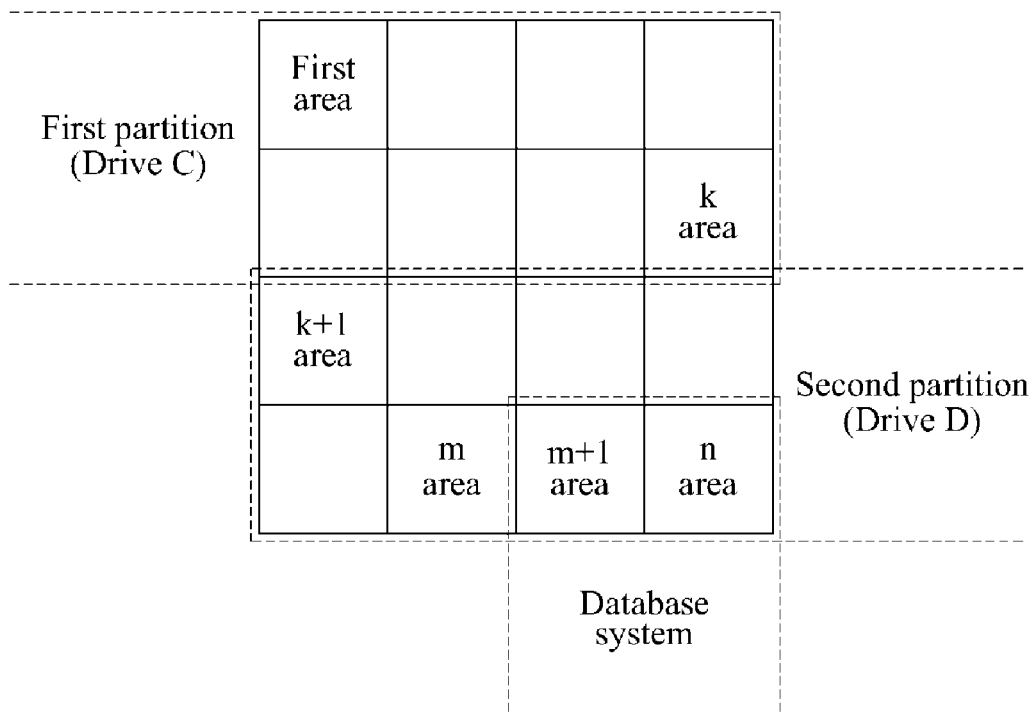
FIG. 7 illustrates an example of a configuration in which at least one area uses a minimum unit of mapping differing for each area according to an embodiment of the present invention.

FIG. 7 illustrates an example of a configuration in which at least one area uses a minimum unit of mapping differing for each area according to an embodiment of the present invention.

Referring to FIG. 7, a first area through a k area may be used by a first partition, for example, a drive C of the file system 410 included in the host system 400. A k+1 area through an n area may be used by a second partition, for example, a drive D of the file system 410.

The file system 410 may use a different block size for each partition. For example, the file system 410 may use a block of 1 KB in the first partition, and use a block of 4 KB in the second partition.

In addition, in FIG. 7, an m+1 area through the n area may be used by the database system 420 of the host system 400. A size of a block used by the database system 420 may differ from the size of the block used by the file system 410.

Accordingly, each of at least one area may use a different fixed size unit, and a size of a block used when the host system 400 accesses data having a logical address corresponding to a predetermined area among the at least one area may be a fixed size unit used for the predetermined area.

The block size determining unit 510 may divide the logical address space 600 of the storage device into at least one area, and determine a minimum unit of mapping to be used for each of the at least one area. The block size determining unit 510 may track a minimum quantity of data requested by a data access request, for each of the at least one area. The block size determining unit 510 may determine the minimum unit of mapping to be used for each of the at least one area based on a quantity of data used by the host system 400 in order to access each of the at least one area.

The address mapping management unit 520 may map a logical address corresponding to a predetermined area among the at least one area, on a physical address of the flash memory 540, using the determined minimum unit of mapping. The address mapping management unit 520 may manage each of the at least one area using a range mapping having a different fixed size unit. Here, the fixed size unit may be a minimum unit of mapping to be used for each of the at least one area.

As described above, the size of each block of the at least one area may be the size of the block used by the file system 410 of the host system 400 or the database system 420 of the host system 400 for each of the at least one area. Thus, the block size determining unit 510 may determine the size of the block used by the host system 400 for each of the at least one area in order to access each of the at least one area. The address mapping management unit 520 may map a logical address corresponding to a predetermined area among the at least one area, on a physical address of the flash memory 540 using the determined size.

Figure 8:
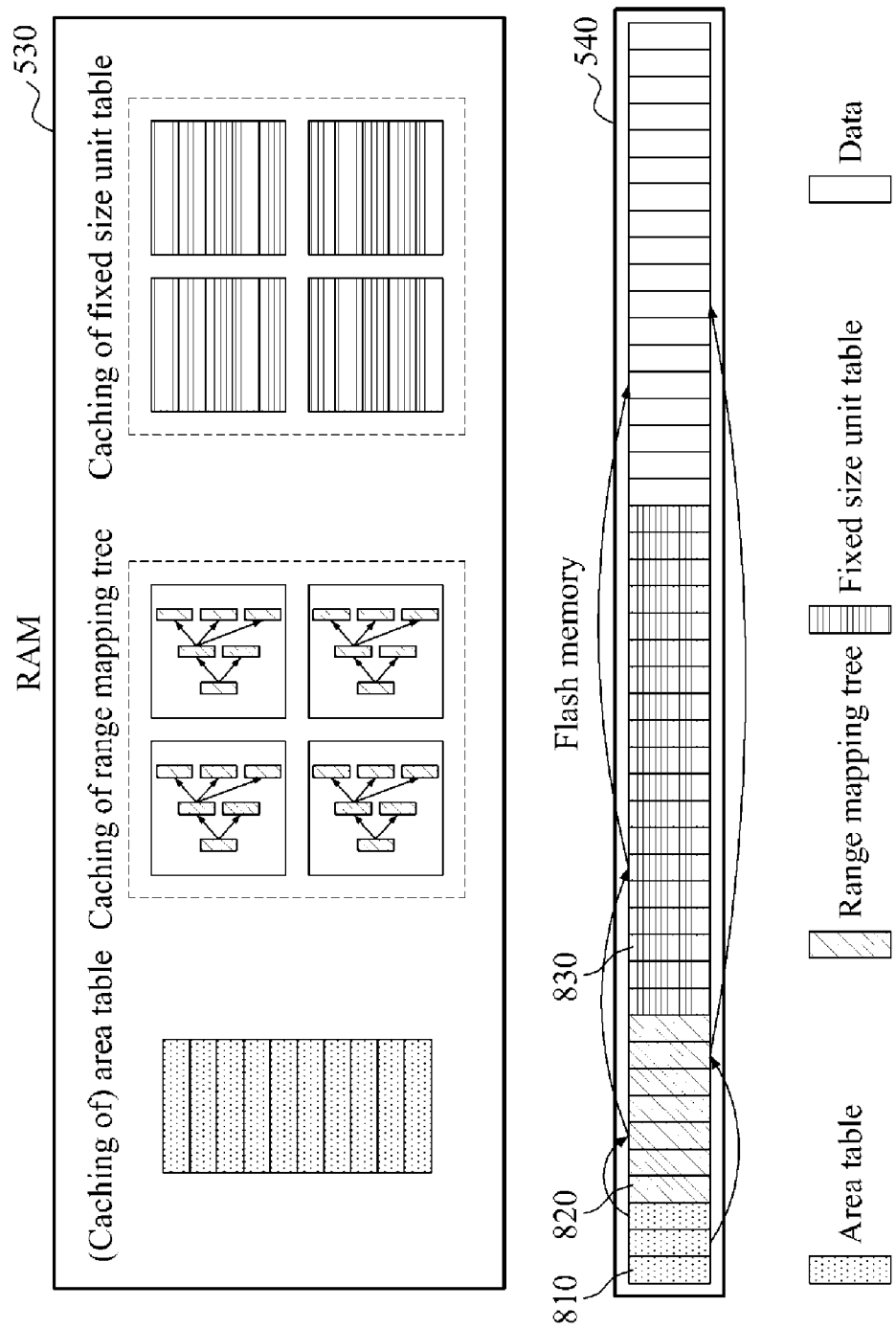
FIG. 8 illustrates an example of a data structure used by a block size determining unit and an address mapping management unit according to an embodiment of the present invention.

FIG. 8 illustrates an example of a data structure used by a block size determining unit and an address mapping management unit according to an embodiment of the present invention.

The flash memory 540 may store an area table 810, a range mapping tree 820, and a fixed size unit table 830.

The RAM 530 may store the area table 810. In addition, the RAM 530 may cache a portion or an entirety of area tables including the area table 810. The RAM 530 may cache a portion or an entirety of range mapping trees including the range mapping tree 820. The RAM may cache a portion or an entirety of fixed size units including the fixed size unit 830. For example, when the storage device 450 is initialized, the block size determining unit 510 may scan a partial area of the flash memory 540 and cache all the area tables including the area table 810 into the RAM 530.

The area table 810 may store a pointer indicating each minimum unit of at least one area and mapping information on each of the at least one area. For example, the area table 810 may include at least one entry, and the entry may store the pointer indicating a minimum unit of mapping of a corresponding area and mapping information on the corresponding area. The pointer may indicate a physical location of the range mapping tree 820 in the flash memory 540.

The block size determining unit 510 may manage the area table 810. The block size determining unit 510 may record, on the area table 810, a minimum quantity of data requested by a data access request tracked for each area.

The address mapping management unit 520 may manage the range mapping tree 820. Hereinafter, descriptions about the range mapping tree 820 and the fixed size unit table 830 will be provided with reference to FIGS. 9 and 10.

Figure 9:
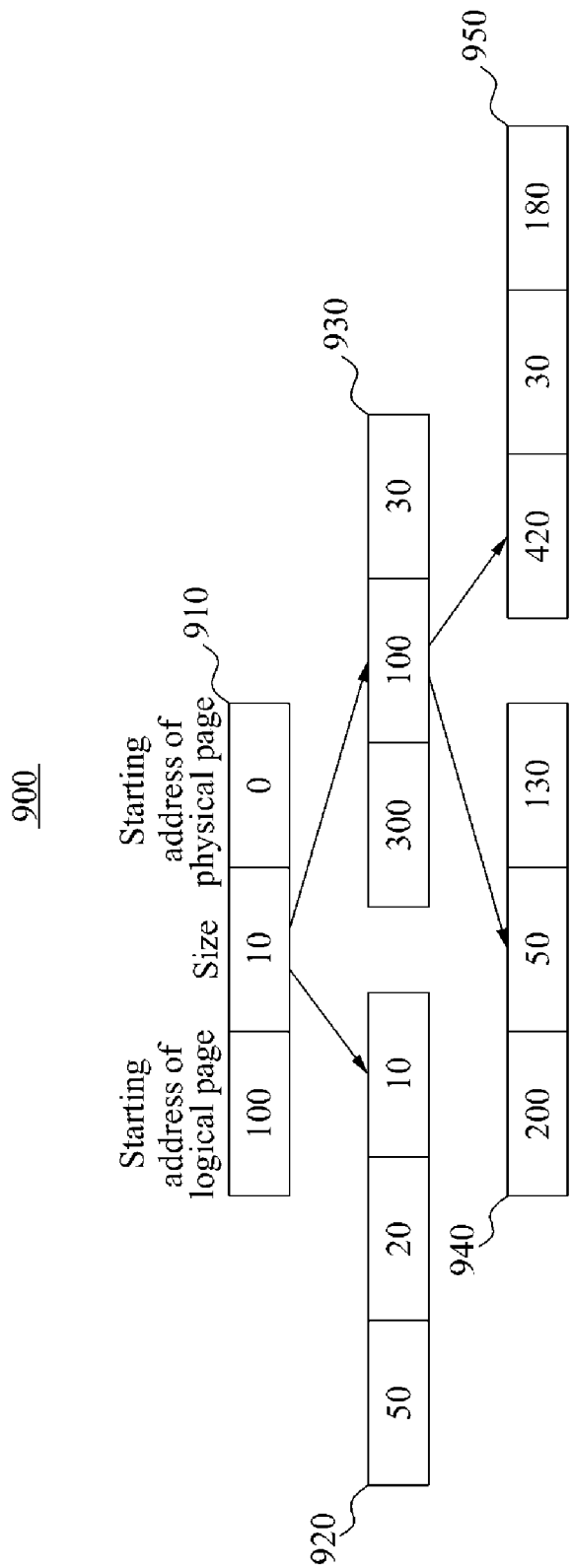
FIG. 9 illustrates an example of a range mapping tree according to an embodiment of the present invention.

FIG. 9 illustrates an example of a range mapping tree according to an embodiment of the present invention.

The address mapping management unit 520 may manage one range mapping tree 900 for one area. Thus, the range mapping tree 900 may be configured for a single area.

A mode of the range mapping tree 900 may include 1) a starting address of a logical page, 2) a size, and 3) a starting address of a physical page. Here, the starting address of the logical page, or the size and the starting address of the logical page may be used as a key of the range mapping tree 900. Also, the size and the starting address of the physical page may be used as data on the range mapping tree 900.

The address mapping management unit 520 may use various tree data structures such as a binary tree, a B-tree, a B+-tree, an AVL-tree, and the like, to be the range mapping tree 900.

The range mapping tree 900 may be extended based on a pattern of a data write request, from the host system 400, for an area corresponding to the range mapping tree 900. For example, when four nodes 910, 920, 930, and 940 are included in the range mapping tree 900, and the host system 400 requests a writing of data of which a starting address of a logical page is "420" and a quantity, for example, a number of blocks is "30", the storage device 450 may store the data in physical pages of the flash memory 540. In this instance, the data may be stored in a physical page having an address of "180" through a physical page having an address of "209". Also, the address mapping management unit 530 may add a fifth node 950 in the range mapping tree 900.

Figure 10:
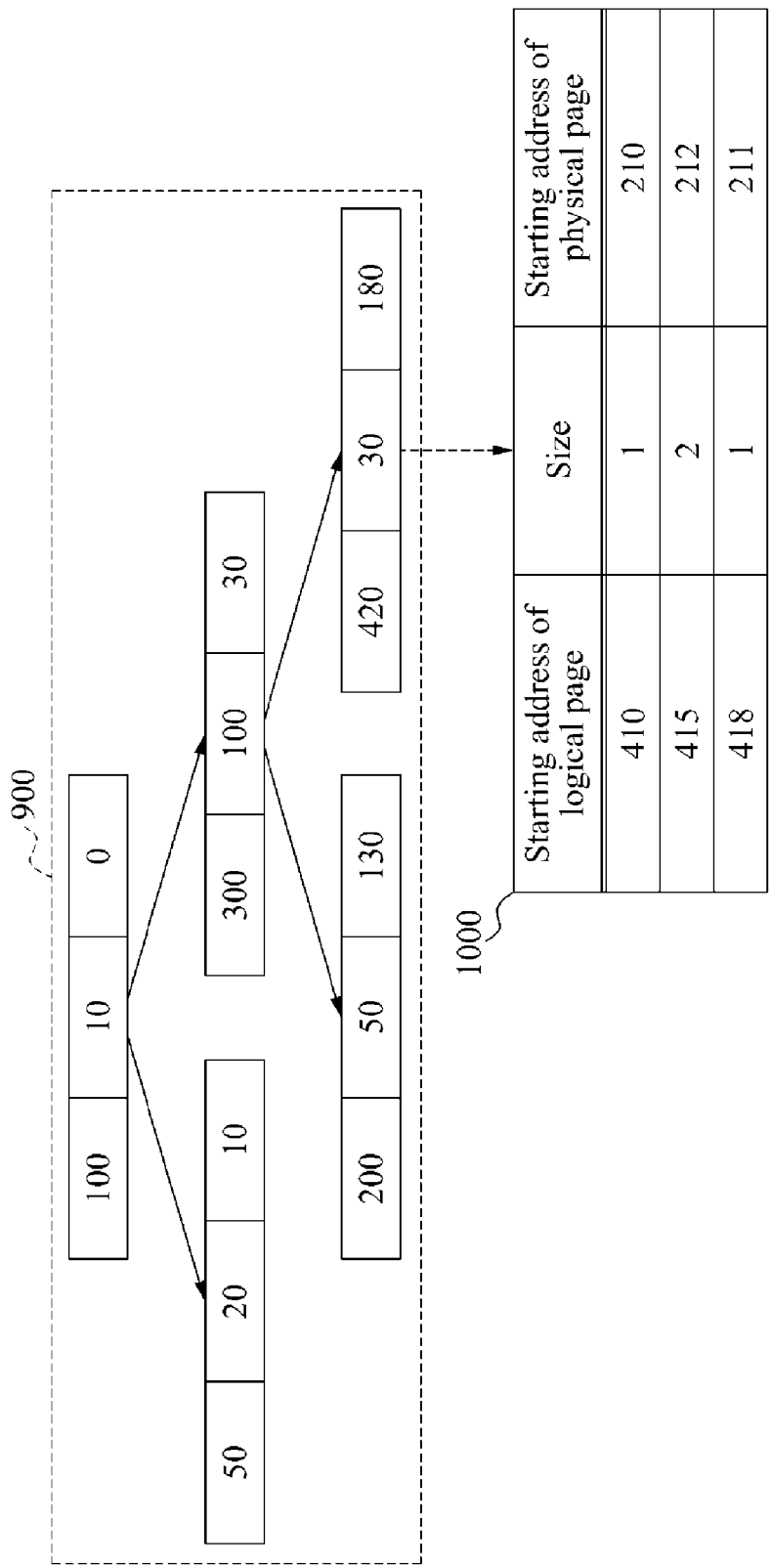
FIG. 10 illustrates an example of a range mapping tree and a fixed size unit table according to an embodiment of the present invention.

FIG. 10 illustrates an example of a range mapping tree and a fixed size unit table according to an embodiment of the present invention.

A maximum size of the range mapping tree 900 may be limited. The maximum size of the range mapping tree 900 may be limited to a size, for example, a size of 2 KB through a size of 16 KB that may be included in a single page of the flash memory 540. When a size of the range mapping tree 900 is greater than or equal to a predetermined size, for example, a single page of the flash memory 540 through an extension based on the pattern of the data write request transmitted from the host system 400, the address mapping management unit 520 may convert a predetermined portion, for example, a predetermined node or leaf node of the range mapping tree 900, into a fixed size unit table 1000. The predetermined node of the range mapping tree 900 may indicate the fixed size unit 1000 in lieu of a node.

Similar to a node of the range mapping tree 900, each entry of the fixed size unit table 1000 may include 1) a starting address of a logical page, 2) a size, and 3) a starting address of a physical page.

A size of the fixed size unit table 1000 may be determined based on a minimum unit of mapping included in the area table 810. A maximum size of the fixed size unit table 100 may be limited to be less than the minimum unit of mapping.

When the host system 400 requests a consecutive writing to the storage device 450, an address transition based on an address mapping may be processed using data on the range mapping tree 900. When the host system 400 requests a random writing to the storage device 450, the address transition based on the address mapping may be processed using the fixed size unit table 1000, based on the minimum unit of mapping included in the area table 810.

Figure 11:
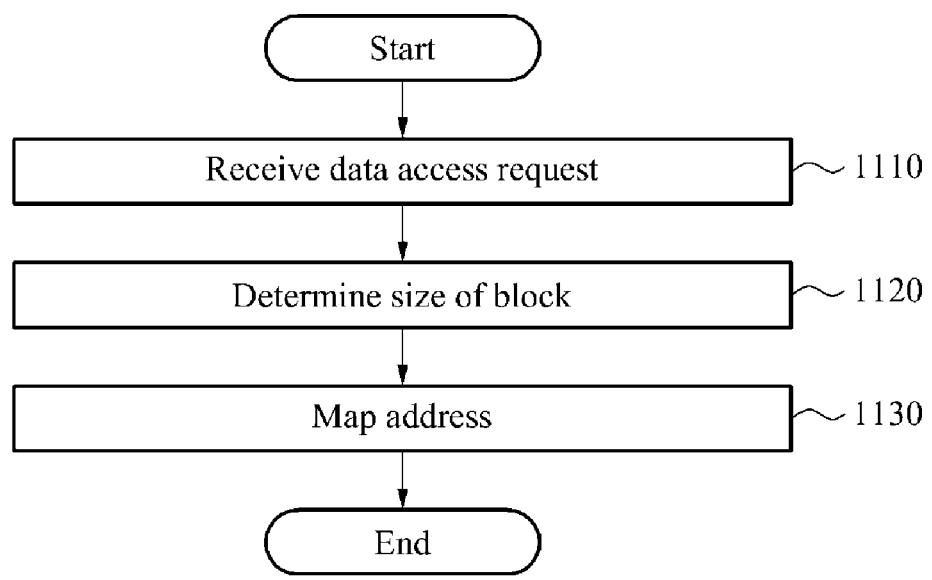
FIG. 11 is a flowchart illustrating an address mapping method of a storage device using a flash memory according to an embodiment of the present invention.

FIG. 11 is a flowchart illustrating an address mapping method of a storage device using a flash memory according to an embodiment of the present invention.

In operation 1110, the storage device 450 may receive a data access request from the host system 400.

In operation 1120, the block size determining unit 510 may determine a size of a block used by the host system 400 connected to the storage device 450. In this instance, the block size may be determined based on a quantity of data requested by the data access request.

In operation 1130, the address mapping management unit 520 may map a logical address of the storage device 450 on a physical address of the flash memory 540, using the determined size as a unit of mapping.

The logical address space 600 of the storage device 450 may be divided into at least one area. In operation 1120, in order to access each of the at least one area, the size of the block used by the host system 400 may be determined for each of the at least one area. In operation 1130, a logical address corresponding to a predetermined area among the at least one area may be mapped on the physical address of the flash memory 540 using the determined size.

Descriptions provided with reference to FIGS. 1 through 10 according to an embodiment of the present invention may be applied to this example embodiment and thus, repeated descriptions will be omitted for increased clarity and conciseness.

Figure 12:
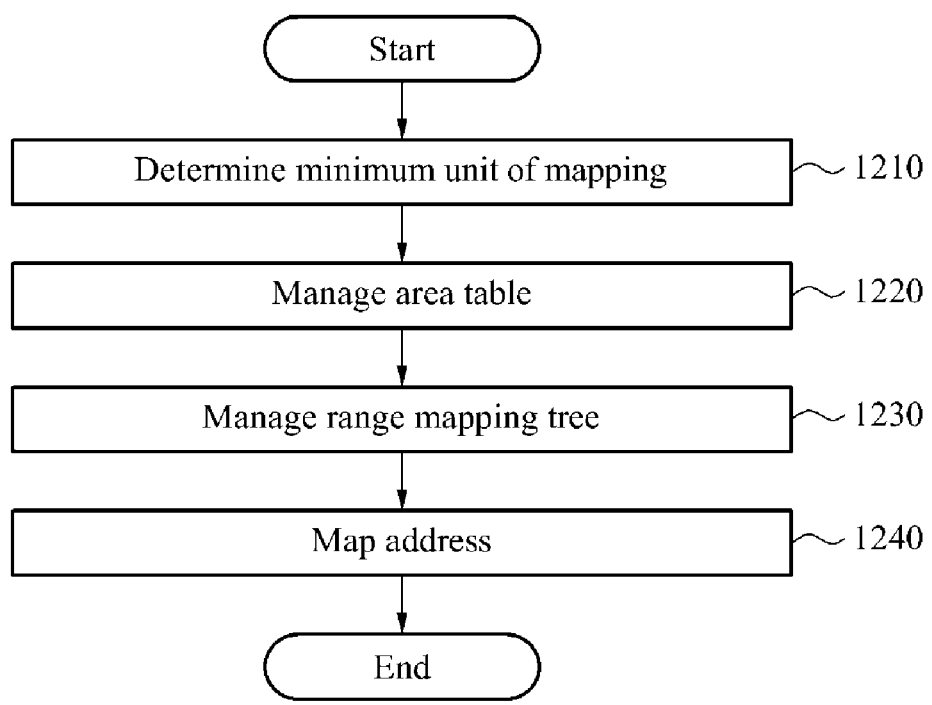
FIG. 12 is a flowchart illustrating an address mapping method of a storage device using a flash memory according to an embodiment of the present invention.

FIG. 12 is a flowchart illustrating an address mapping method of a storage device using a flash memory according to an embodiment of the present invention.

In operation 1210, the block size determining unit 510 may divide the logical address space 600 into at least one area, and determine a minimum unit of mapping to be used for each of the at least one area. In order to access each of the at least one area, the block size determining unit 510 may determine the minimum unit of mapping based on a quantity of data used by the host system 400.

The block size determining unit 510 may manage each of the at least one area using a range mapping having a different fixed size unit. Here, the fixed size unit may be the minimum unit of mapping to be used for each of the at least one area.

In operation 1220, the block size determining unit 510 may manage the area table storing a pointer indicating each minimum unit of mapping for the at least one area and mapping information associated with each of the at least one area.

In operation 1230, the address management unit 520 may manage the range mapping tree 820 storing the mapping information on each of the at least one area.

In operation 1230, the address mapping management unit 520 may extend the range mapping tree based on a pattern of a data write request requested from the host system 200 for an area corresponding to the range mapping tree 900. In operation 1230, when a size of the range mapping tree 900 is greater than or equal to a predetermined size, the address mapping management unit 520 may convert a predetermined portion of the range mapping tree 900 into the fixed size unit table 1000 indicating at least one fixed size unit.

In operation 1240, the address management unit 520 may map a logical address corresponding to a predetermined area among the at least one area on a physical address of the flash memory 540, using the determined minimum unit of mapping.

Descriptions provided with reference to FIGS. 1 through 11 according to an embodiment of the present invention may be applied to this example embodiment and thus, repeated descriptions will be omitted for increased clarity and conciseness.

The method according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy discs, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Thus, other implementations, alternative embodiments and equivalents to the claimed subject matter are construed as being within the appended claims.

DESCRIPTION OF THE REFERENCE NUMERALS

450: Storage device
510: Block size determining unit
520: Address mapping management unit
530: RAM
540: Flash memory

What is claimed is:

1. A storage device comprising:
a flash memory to store data;
a block size determining unit to determine a size of a block used by a host system connected to the storage device; and
an address mapping management unit to map a logical address of the storage device to a physical address of the flash memory, using the determined size as a unit of mapping.

2. The device of claim 1, wherein the block size determining unit determines the size of the block used by the host system in response to a data access request of the host system.

3. The device of claim 1, wherein the block size determining unit determines the size of the block used by the host system based on a quantity of data requested by the data access request.

4. The device of claim 1, wherein the block size determining unit determines that the size of the block used by the host system corresponds to a minimum quantity of data among quantities of data requested by at least one data access request.

5. The device of claim 1, wherein the size of the block is a size of a block used by a file system of the host system, or a database system of the host system.

6. The device of claim 1, wherein a logical address space of the storage device is divided into at least one area,
wherein the block size determining unit determines the size of the block used by the host system, for each of the at least one area in order to access each of the at least one area, and
wherein the address mapping management unit maps the logical address corresponding to a predetermined area among the at least one area, to a physical address of the flash memory using the determined size.

7. A storage device comprising:
a flash memory to store data;
a block size determining unit to divide a logical address space of the storage device into at least one area, and determine a minimum unit of mapping to be used for each of the at least one area; and
an address mapping management unit to map a logical address corresponding to a predetermined area among the at least one area, on a physical address of the flash memory using the determined minimum unit of mapping.

8. The device of claim 7, wherein the address mapping management unit manages each of the at least one area using a range mapping having a different fixed size unit, and
wherein the fixed size unit is the minimum unit of mapping to be used for each of the at least one area.

9. The device of claim 7, wherein the block size determining unit manages an area table storing a pointer indicating mapping information on each of the at least one area and the minimum unit of mapping to be used for each of the at least one area, and
wherein the address mapping management unit manages a range mapping tree storing the mapping information on each of the at least one area.

10. The device of claim 9, wherein the range mapping tree is extended based on a pattern of a data write request requested from a host system for an area corresponding to the range mapping tree, and
wherein when a size of the range mapping tree is greater than or equal to a predetermined size, the address mapping management unit converts a predetermined portion of the range mapping tree into a fixed size unit table indicating at least one fixed size unit.

11. The device of claim 10, wherein the flash memory stores the area table, the range mapping tree, and the fixed size unit table, and
wherein the storage device further comprises a random-access memory (RAM) to cache the area table, the range mapping tree, and the fixed size unit table.

12. The device of claim 7, wherein the block size determining unit determines the minimum unit of mapping to be used for each of the at least one area, based on a quantity of data used by the host system in order to access each of the at least one area.

13. The device of claim 12, wherein the minimum unit of mapping is a size of a block used by a file system of the host system, or a database system of the host system for each of the at least one area.

14. An address mapping method of a storage device using a flash memory, the method comprising:

determining a size of a block used by a host system connected to a storage device; and mapping a logical address of the storage device to a physical address of the flash memory, using the determined size.

15. An address mapping method of a storage device using a flash memory, the method comprising:

dividing a logical address space of the storage device into at least one area and determining a minimum unit of mapping to be used for each of the at least one area; and mapping a logical address corresponding to a predetermined area among the at least one area, to a physical address of the flash memory using the determined size.

* * * * *